United States Patent
Mishael et al.

(10) Patent No.: US 12,139,421 B2
(45) Date of Patent: Nov. 12, 2024

(54) COMPOSITE AND METHOD FOR REMOVING DISSOLVED ORGANIC MATTER FROM WATER

(71) Applicant: YISSUM RESEARCH DEVELOPMENT COMPANY OF THE HEBREW UNIVERSITY OF JERUSALEM LTD., Jerusalem (IL)

(72) Inventors: Yael Mishael, Rehovot (IL); Ofri Zusman, Ganei Tal (IL); Mario Kummel, Rehovot (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 12 days.

(21) Appl. No.: 17/841,774

(22) Filed: Jun. 16, 2022

(65) Prior Publication Data
US 2022/0402779 A1    Dec. 22, 2022

Related U.S. Application Data

(60) Provisional application No. 63/211,567, filed on Jun. 17, 2021.

(51) Int. Cl.
*C02F 1/28* (2023.01)
*B01J 20/12* (2006.01)
(Continued)

(52) U.S. Cl.
CPC .............. *C02F 1/288* (2013.01); *B01J 20/12* (2013.01); *B01J 20/261* (2013.01);
(Continued)

(58) Field of Classification Search
None
See application file for complete search history.

(56) References Cited

U.S. PATENT DOCUMENTS

| | | |
|---|---|---|
| 3,288,770 A | 11/1966 | Butler |
| 4,151,202 A | 4/1979 | Hunter et al. |
| | (Continued) | |

FOREIGN PATENT DOCUMENTS

| | | |
|---|---|---|
| CN | 105289531 A | 2/2016 |
| WO | 2012/176190 A1 | 12/2012 |
| | (Continued) | |

OTHER PUBLICATIONS

Machine translation of WO 2015015027 downloaded Sep. 29, 2023 (Year: 2023).*

(Continued)

*Primary Examiner* — Chester T Barry
(74) *Attorney, Agent, or Firm* — McCormick, Paulding & Huber PLLC

(57) ABSTRACT

A process for preparing a granular composite adsorbent, that includes combining poly(diallyl dimethyl ammonium halide) and a clay mineral in water, maintaining the mixture under stirring, recovering a wet mass, forming the wet mass into granules and drying the granules to obtain the granular adsorbent having surface layer with positive zeta potential. The granular material and methods using the granular material in water treatment are also disclosed.

17 Claims, 6 Drawing Sheets

(51) Int. Cl.
  *B01J 20/26* (2006.01)
  *B01J 20/28* (2006.01)
  *B01J 20/30* (2006.01)
  *C02F 1/42* (2023.01)
  *C02F 101/32* (2006.01)
  *C02F 101/34* (2006.01)
  *C02F 101/36* (2006.01)
  *C02F 101/38* (2006.01)
  *C02F 103/00* (2006.01)

(52) U.S. Cl.
  CPC ... *B01J 20/28004* (2013.01); *B01J 20/28016* (2013.01); *B01J 20/3028* (2013.01); *C02F 1/281* (2013.01); *C02F 1/283* (2013.01); *C02F 1/285* (2013.01); *C02F 2001/425* (2013.01); *C02F 2101/322* (2013.01); *C02F 2101/34* (2013.01); *C02F 2101/345* (2013.01); *C02F 2101/36* (2013.01); *C02F 2101/38* (2013.01); *C02F 2103/007* (2013.01); *C02F 2301/08* (2013.01); *C02F 2303/16* (2013.01)

(56) References Cited

U.S. PATENT DOCUMENTS

| | | | | |
|---|---|---|---|---|
| 2002/0173423 | A1* | 11/2002 | Massmann | A01N 57/20 504/106 |
| 2011/0104494 | A1* | 5/2011 | Brandt | B01J 20/183 423/710 |
| 2017/0297926 | A1* | 10/2017 | Nickelsen | B01J 41/05 |

FOREIGN PATENT DOCUMENTS

| | | |
|---|---|---|
| WO | 2015/015027 A1 | 2/2015 |
| WO | 2017/158581 A1 | 9/2017 |

OTHER PUBLICATIONS

Machine translation of CN105289531 downloaded Sep. 29, 2023 (Year: 2023).*

Yeskendir et al., From metal-organic framework powders to shaped solids: recent developments and challenges, : Mater. Adv., 2021, 2, 7139 (Year: 2021).*

Ganigar et al. "Polymer-clay nanocomposites for the removal of trichlorophenol from water." Applied Clay Science. Jun. 22, 2010. pp. 311-316. vol. 49.

Gunister et al. "Poly (diallyldimethylammoniumchloride)/sodium-montmorillonite composite; structure, and adsorption properties." Journal of Applied Polymer Science. Nov. 27, 2012. pp. 1232-1237. vol. 129, Issue 3. Abstract provided.

Radian et al. "Effect of humic acid on pyrene removal from water by polycation-clay mineral composites and activated carbon." Environmental Science & Technology. 2012. pp. 6228-6235. vol. 46.

Ray et al. "Polymer-clay composite geomedia for sorptive removal of trace organic compounds and metals in urban stormwater." Water Research. Apr. 3, 2019. pp. 454-462. vol. 157.

Sabarish et al. "PVA/PDADMAC/ZSM-5 zeolite hybrid matrix membranes for dye adsorption: Fabrication, characterization, adsorption, kinetics and antimicrobial properties." Journal of Environmental Chemical Enginnering. 2018. pp. 3860-3873. vol. 6.

Zadaka et al. "Atrazine removal from water by polycation—clay composites: Effect of dissolved organic matter and comparison to activated carbon." Water Research. Nov. 8, 2008. pp. 677-683. vol. 43.

Le Forestier et al. "Textural and hydration properties of a synthetic montmorillonite compared with a natural Na-exchanged clay analogue." Applied Clay Science. 2010. pp. 18-25. vol. 48.

Zusman, Ofri B., et al. "Dissolved Organic Matter Adsorption From Surface Waters By Granular Composites Versus Granular Activated Carbon Columns: An Applicable Approach", Water Research 181 (2020) 115920, pp. 1-12.

* cited by examiner

COMPOSITE AND METHOD FOR REMOVING DISSOLVED ORGANIC MATTER FROM WATER

CROSS-REFERENCE TO RELATED APPLICATION

This application claims priority to U.S. Provisional Patent Application No. 63/211,567, filed Jun. 17, 2021, which is hereby incorporated by reference in its entirety.

TECHNICAL FIELD

The present application relates to composite and method for removing dissolved organic matter from water.

BACKGROUND

Dissolved organic matter (DOM) is a heterogeneous mixture of organic molecules occurring mainly in surface-waters. The heterogeneity of the DOM is expressed both in the size of the molecules and in their chemical properties. The range of sizes can vary from single amino acid to macromolecule of up to 0.45 μm. DOM concentrations, components, and chemical properties vary considerably from one location to another and depend on several variables, such as the origin of organic matter, temperature, ionic strength, pH, microbial community, etc.

In water treatment facilities DOM causes several problems, mainly the enhancement of biofilms growth on pipelines and membranes. Another problem related to DOM is that water disinfection by chlorination leads to the formation of carcinogenic by-products (DBPs), like trihalomethanes and haloacetic acid.

One major component of DCM includes dissolved humic substances. Dissolved humic substances are usually characterized by high molecular weight, diverse hydroxyl and carboxyl groups with the majority undergoing deprotonation at ambient pH (that is, exist as negatively charged species in the solution) and they also bear high aromaticity which is the main contribution to the bulk DOM UV absorption. Therefore, common methods to measure DOM concentrations include total organic carbon (TOC), chemical oxidation demand (COD), and ultraviolet (UV) absorption. A simple and a good measure of the bulk DOM aromaticity is specific UV absorbance (SUVA). $SUVA_{254}$ is defined as the UV absorbance at a wavelength of 254 nm normalized to the dissolved organic carbon (DOC) concentration. That is, a higher $SUVA_{254}$ value indicates a greater aromatic content in the water.

There are several methods to reduce DOM concentrations, such as flocculation/coagulation, oxidation, membrane separation and sorption to solid surfaces. Regarding the latter method, perhaps the most common sorbent used is activated carbon (AC), which is employed in water treatment plants worldwide owing to its high surface area and affinity towards a wide range of organic pollutants. Granular activated carbon (GAC) is the common form of AC used in filtration columns, due to its high hydraulic conductivity. The shortcomings of GAC are chiefly associated with its lack of specificity towards certain pollutants, drop in performance with passage of time and costly/laborious sorbent regeneration (e.g., thermal regeneration at 700° C., which requires material transportation to suitable sites).

In recent years there is a trend towards adsorbents based on polymer-clay composites to replace GAC. One polymer considered for this purpose is poly(diallyl dimethyl ammonium chloride); hereinafter abbreviated PDADMAC]. See Ganigar et al., 2010. Polymer-clay nanocomposites for the removal of trichlorophenol from water. Appl. Clay. Sci. 49, 311-316; Gunsiter et al., 2013. Poly(diallyl dimethyl ammonium chloride)/sodium-montmorillonite composite; structure, and adsorption properties. J. Appl. Polym. Sci. 129, 1232-1237 (2013); Radian et al., 2012. Effect of humic acid on pyrene removal from water by polycation-clay mineral composites and activated carbon. Environ. Sci. Technol. 46, 6228-6235; Ray et al., 2019. Polymer Polymer-clay composite geomedia for sorptive removal of trace organic compounds and metals in urban stormwater. Water Res. 157, 454-462; Sabarish et al., 2018. PVA/PDADMAC/ZSM-5 zeolite hybrid matrix membranes for dye adsorption: Fabrication, characterization, adsorption, kinetics and antimicrobial properties. J. Environ. Chem. Eng. 6, 3860-3873; Zadaka et al., 2008. Atrazine removal from water by polycation-clay composites: Effect of dissolved organic matter and comparison to activated carbon. Water Res. 43, 677-683.

PDADMAC-clay composites reported in the publications mentioned above were generally tested in a powdery form to assess their adsorption capacity. Powders display relatively low hydraulic conductivity. This restricts the ability to use powdery adsorbents in industrial filtration columns.

To gain commercial acceptance as replacement of GAC in filtration columns, efficient densification of the PDADMAC-clay composite powder to pellets or granules is needed, to create mechanically strong pellets or granules which would remain intact during water filtration. However, little has been reported in the art in this respect. For example, in WO 2012/176190 and WO 2017/158581, PDADMAC-clay composites were prepared by addition of the polymer solution to an aqueous suspension of the mineral followed by vigorous agitation. No data regarding granulation of the composite is given. In WO 2015/015027, there are described polymer-clay composites based on adsorption of cationic polymer, such as PDADMAC, on negatively charged clay mineral, such as montmorillonite. Although it is stated in WO 2015/015027 that the composite may be either granular per se, or applied onto a granular support, no working procedure is provided. Another attempt to provide polymer-clay composite in a granular form is found in CN 105289531, where montmorillonite and an organic surface modifier (a quaternary ammonium halide salt), and additional components, are combined to form a slurry. Following agitation and filtration, the wet filter cake is extruded to form cylindrical pellets with the aid of a squeezer.

SUMMARY

We have now found that PDADMAC-clay composites can be prepared as a moist mass which fits well into granulation to afford, upon drying, mechanically strong granules which do not disintegrate in water and are able to demonstrate good DOM removal rates from water. It is also possible to produce such granules in the absence of added binder, by forcing a moist material consisting of the wet PDADMAC-clay composites through suitable screens, as explained below. The granular composite of the invention is abbreviated herein GPDADMAC-clay.

One aspect of the invention a process for preparing a granular composite adsorbent, comprising combining poly (diallyl dimethyl ammonium halide) and a clay mineral in water, maintaining the mixture under stirring, recovering a wet mass, forming the wet mass into granules and drying the granules to obtain the granular adsorbent having surface layer with positive zeta potential.

The clay mineral and PDADMAC are combined in water in a controlled manner. That is, one or both components, is (are) charged to a reaction vessel over an extended time period, e.g., through dropwise addition or portion-wise addition. For example, the two components are combined by slowly adding an aqueous solution of PDADMAC to a reaction vessel that was previously charged with an aqueous suspension of the clay mineral, to reach the desired mixing proportions, e.g., from 5:1 to 7:1, e.g., 5.5:1 to 6.5:1, around 6.2:1 to 6.3:1; weight proportion in favor of the clay. On a laboratory scale, suitable addition rate of the polymer solution is in the range from 15 to 30 ml per minute, e.g., around 20 ml per minute. Another way to controllably combine the two components is through simultaneous feeding of separate streams (polymer solution and clay suspension) to a reaction vessel under vigorous stirring.

Poly(diallyl dimethyl ammonium chloride) is commercially available in a powder form or in aqueous solution with varying strengths. The polymerization of the monomer diallyl dimethyl ammonium chloride is described in U.S. Pat. No. 3,288,770 and preparation of a polymer solution (~30% polymer) can be found in U.S. Pat. No. 4,151,202. Low molecular weight (<100,000), medium molecular weight (200,000-400,000) and high molecular weight (400,000-500,000) grades can be used. Owing to its high solubility in water, in the method of the invention the polymer is conveniently employed in the form of an aqueous solution. The concentration of the polymer feed solution may range from 3 to 10 g/liter, e.g., around 4-6 g/liter.

Clay minerals for use in the invention include kaolinite, halloysite, saponite, illite, vermiculite, palygorskite (attapulgite), sepiolite and montmorillonite. Preferred are clay mineral with high cation exchange capacity (CEC), greater than 30 milliequivalents/100 g, e.g., CEC>50 milliequivalents/100 g, such as CEC>70 milliequivalents/100 g, e.g., 70<CEC<100 milliequivalents/100 g, (at pH=7). Montmorillonite (MMT), with sodium and/or calcium exchangeable cations, preferably sodium-rich montmorillonite (Na-MMT, such as Na-exchanged Wyoming montmorillonite), onto which organic cations are strongly adsorbed, i.e., by displacing the alkali/alkali earth cations, was used in the experimental work reported herein and was shown to give good results. That is, MMT, Na-MMT and clay minerals consisting mostly of MMT or Na-MMT, such as bentonite, are especially preferred according to the invention. Hereinafter these minerals are collectively indicated by the abbreviation MMT or Na-MMT, unless specifically indicated otherwise, and the corresponding granular material, which represents the preferred embodiment of the invention, is abbreviated GPDADMAC-MMT. It should be noted that the invention is not limited to the use of natural minerals, synthetic analogues such as those reported by LE Forestier et al. [Textural and hydration properties of a synthetic montmorillonite compared with a natural Na-exchanged clay analogue; Applied Clay Science, Elsevier, 2010, 48, pp. 18-25. 10.1016/j.clay.2009.11.038. insu-00433524] can also be used.

The clay (or synthetic analogue thereof), in a powder form with surface area (BET) of not less than 30 m²/g is generally used; such powder is added to water to form an aqueous slurry with concentration in the range from 1 to 10 g/liter, e.g., around 3-7 g/liter, for example, 5 g/liter, with which the aqueous polymer solution is combined as described above, to achieve the desired 5:1 to 7:1 clay/polymer weight mixing ratio.

For example, the polymer solution is added to the clay suspension to adjust the concentrations of the clay and polymer in the resultant aqueous mixture to about ~4.2 g/liter and ~0.66 g/liter, respectively, working at ~6.25:1 clay/polymer weight ratio.

The aqueous mixture consisting of the suspended clay mineral and the dissolved polymer is stirred over a time period, for example, for not less than 4 hours, to achieve high loading of the polymer onto the clay particles, following which an extrudable/granultable wet mass is recovered, by separating the solid from the liquid phase (e.g., by filtration, decantation or any other solid/liquid separation method), and adjusting the moisture content of the isolated wet solid. We have found that by drying the wet solid (e.g., in an oven or in a freeze-dryer) to reach moisture content from 60 to 80 wt. %, e.g., from 65 to 75 wt. %, such as 70±2 wt. %, a moist material is obtained which lends itself particularly well to granulation by forced screening methods. That is, by passing the moist material through a screen (for example, 5, 6, 7, 8, 9 or 10 meshes, corresponding to aperture size of 2 to 4 mm). Industrial granulators equipped with suitable screens which can be used for this purpose are known in the art.

The output granulate is dried and sieved to collect a fraction consisting of ~0.2 to 3.0 mm sized particles, e.g., 0.3 to 2.5 mm. Drying could be achieved by different methods; we have found that either oven-dried, air-dried or freeze-dried GPDADMAC-clay could be used for removing DOM from water. Freeze drying appears to preserve the porosity of the clay support and could be considered as the method of choice for drying the granulate. Still, oven-dried, especially small sized GPDADMAC-clay can also perform well, as shown below.

Under the conditions set out above, mechanically strong GPDADMAC-clay with positive surface zeta potential (e.g., not less than 10 mV, e.g., from 20 to 50 mV, such as around 25 to 35 mV) are formed. The positive surface zeta potential possessed by the GPDADMAC-clay accounts for its ability to electrostatically attract deprotonated DOM components (namely, negatively charged molecules) and remove them from the water. For example, zeta potential measurement could be carried out by Malvern instruments using the principle of electrophoresis, where electrophoretic mobility is measured for example by light scattering technique and converted into zeta potential through the Henry equation.

Accordingly, another aspect of the invention is a granular adsorbent comprising poly(diallyl dimethyl ammonium halide) and a clay mineral (GPDADMAC-clay), said granular adsorbent having positive surface zeta potential as set out above. Compositionally, the granular sorbent comprises clay and polymer at weight ratio in the range from ~5.5:1 to 9:1, e.g., from 85 to 93 wt. % of clay mineral having cation exchange capacity of not less than 30 milliequivalents/100 g, for example, from 88 to 90%; and from 7 to 15 wt. % of poly(diallyl dimethyl ammonium halide), for example, from 10 to 12%.

A specific aspect of the invention consists of a binder-free GPDADMAC-clay, e.g., binder free GPDADMAC-MMT. For example, freeze-dried or oven-dried granules, e.g., with an average particle size within the range from 0.2 mm to 3.0 mm, e.g., 0.3 mm to 2.5 mm.

As pointed out above, GPDADMAC-clay is an efficient adsorbent. Accordingly, another aspect of the invention is a method of water treatment, comprising removing dissolved organic material from water by adsorption onto GPDADMAC-clay.

For example, the adsorption onto GPDADMAC-clay could be a fixed-bed adsorption, wherein the GPDADMAC-clay is packed in a fixed-bed column, through which the water to be treated is passed.

Regarding characteristics of the water to be treated, for example, surface water, we tested the removal of DOM from Lake Kinneret by filtration with columns packed with GPDADMAC-MMT composite and compared to the filtration by GAC columns. The water of Lake Kinneret is characterized by relatively very low dissolved humic substances content, only ~30% from the bulk DOM (Barkay-Arbel, 2013) unlike most surface waters in the world, which have a high content of humic substances, >50% (Korshin et al., 1999; Leenheer, 1981; Thurman and Malcolm, 1981). Lake Kinneret has a low SUVA value (~1) while, surface waters around the world have higher SUVA values (~3) (Ates et al., 2007; Edzwald, 1993; Edzwald et al., 1985). Therefore, the filtration of Suwannee River DOM, with a more representative SUVA of ~3.6, was explored as well. The results reported below indicate that GPDADMAC-clay of the invention lends itself particularly well to removing DOM possessing high aromatic content, indicated by the water having $SUVA_{254}$ value above 2, e.g., above 3.

Accordingly, a specific aspect of the invention is a method of water treatment, comprising removing dissolved organic material from high-$SUVA_{254}$ water by adsorption onto GPDADMAC-clay.

To carry out water treatment according to the invention, the GPDADMAC-clay is packed in a fixed-bed column configured, for example, as downflow fixed bed. Important advantages afforded by the GPDADMAC-clay are that it is regenerable on-site, e.g., by pumping an aqueous salt solution (e.g., >1M alkali halide solution such as 2M sodium chloride) through the column once the GPDADMAC-clay bed has exhausted and that it demonstrates excellent post-regeneration action. The experimental results reported below indicate that DOM removal rates achieved by the regenerated GPDADMAC-clay are comparable to those obtained with a fresh composite. In contrast, the performance of thermally reactivated GAC drops sharply compared to that of fresh GAC.

The GPDADMAC-clay of the invention can be used in a single downflow fixed bed column or in large-scale filtration units, in which GAC is currently being used, based on multiple columns set-ups. For example, units where individual columns are arranged to operate in series (each column is connected in series to the first (lead) column, such that a successive column receives incoming water stream with decreasing pollutant loading). Another example is that of downflow fixed beds operating in parallel, where the pollutant loading received by each column is the same. Fixed bed filtration columns operating in industrial plants will be packed with 10 to 15 m³ of GPDADMAC-clay. The GPDADMAC-clay of the invention fits well into these and other configurations where GAC is currently being used (e.g., pulsed bed).

We have also found that combinations consisting of GAC and GPDADAMAC-clay, designated herein GAC/GPDADAMAC-clay (such as GAC/GPDADAMAC-MMT), are of potential benefit in removing DOM from low SUVA waters. As pointed out above, GPDADAMAC-clay of the invention is well suited to DOM removal from high SUVA waters, and is less effective in treating low SUVA waters. On the other hand, GAC performs well as adsorbent in low SUVA waters, but its reactivated forms demonstrate significant drop of activity. The two adsorbents also show opposite dependence of DOM removal on temperature variation: removal of DOM from low SUVA waters by the GAC column increases moderately with increasing temperature, whereas DOM filtration by the GPDADMAC-MMT column decreases significantly with increasing temperature.

In the study reported below, GAC/GPDADAMAC-clay combination packed into a downflow fixed-bed column achieved high DOM removal rate from low SUVA water (90%), better than those measured by regenerated GAC or virgin GPDADMAC-MMT (about 75 and 40%, respectively). Furthermore, as seen in the experimental results below, the opposing temperature effects observed for the individually operating adsorbents were cancelled out, reaching essentially constant filtration performance. By essentially constant filtration performance is meant that the difference (Δ) between removal percentages measured at T2 (e.g., 40° C.) and T1 (e.g., 6° C.) is less than 5%, e.g., less than 3%.

Accordingly, the invention further provides a method of water treatment, comprising removing dissolved organic material from water by adsorption onto:
  granular activated carbon; and
  granular sorbent comprising poly(diallyl dimethyl ammonium halide) and a clay mineral, said granular sorbent having a surface layer with positive zeta potential, e.g., as previously described.

The GAC/GPDADAMAC-clay combination can be employed in different ways. For example, for removing dissolved organic material from water by a fixed-bed adsorption, wherein the fixed-bed consists of the mixed granular material GAC/GPDADAMAC-clay. That is, either in the form of homogeneous blend of the two types of granules (e.g., proportioned 90:10 to 10:90 by weight, such as equally proportioned (50:50) blend packed in a fixed bed column. In another design, the fixed bed is composed of two or more (alternate) layers, each layer consisting of granules of one type, with the top layer being either GAC or GPDADAMAC-clay. The number of layers (e.g., two or more) and their thickness can be readily determined by a person of ordinary skill in the art. Experimental results reported below indicate that these designs afford comparable DOM removal rates.

Incorporation of the GPDADAMAC-clay composite of the invention into GAC filtration units is not limited to a "mixed" bed design and can be done in other ways. For example, when multiple GAC columns are connected to operate in series, then one or more of the individual columns located downstream (intended to receive low SUVA feed stream with light pollutant loading) could be packed with the GPDADAMAC-clay in place of GAC.

Accordingly, another aspect of the invention is a method of water treatment, comprising removing dissolved organic material from water by passing the water through an array of fixed-bed adsorption columns connected to operate in series, wherein one or more of said columns is(are) packed with granular activated carbon and one or more of the remaining columns is(are) packed with the granular adsorbent of the invention.

The treatment of surface water is just one example in which the GPDADMAC-clay sorbent of the invention can be used. Experimental work conducted in support of this invention indicates that the GPDADMAC-clay sorbent is also of potential benefit in removing micropollutants from waste streams, e.g., secondary effluents produced by wastewater treatment (for example, municipal) plants, showing comparable efficiency to GAC. A specific class of micropollutants of interest consists of pharmaceutically or agriculturally active compounds with molar mass>150 g/mol, e.g., from 200 to 500 g/mol. Pharmaceutically or agriculturally active compounds in commercial use may be divided into three categories:

non-ionic compounds (neutral molecules);

cationic compounds (undergoing protonation at nearly neutral pH, for example, compounds bearing amine functional groups; their commercial form is often an acid addition salt, such as the hydrochloric, tartaric, maleate, besylate salts);

anionic compounds (undergoing deprotonation at nearly neutral pH, for example, compounds bearing one or more carboxylic acid functional groups; their commercial form is often the sodium, potassium or calcium salts).

The GPDADMAC-clay of the invention was tested in downflow fixed-bed adsorption experimental set-up and found to demonstrate efficient adsorption (comparable to that of GAC) towards adsorbates representatives of the three categories mentioned above. Bearing in mind the positive surface layer of the GPDADMAC-clay adsorbent (indicated by its positive zeta potential), its ability to extract positively charged species from solution is quite surprising, as discussed in the experimental section below. These results, in conjunction with its ease of regeneration, suggest that the GPDADMAC-clay of the invention can replace, or combined with, GAC, to capture micropollutants from wastewater streams, e.g., municipal or industrial, by filtration through fixed-bed adsorption columns with the configurations described above.

DETAILED DESCRIPTION

Examples

Materials

Figures 1A, 1B, 1C:
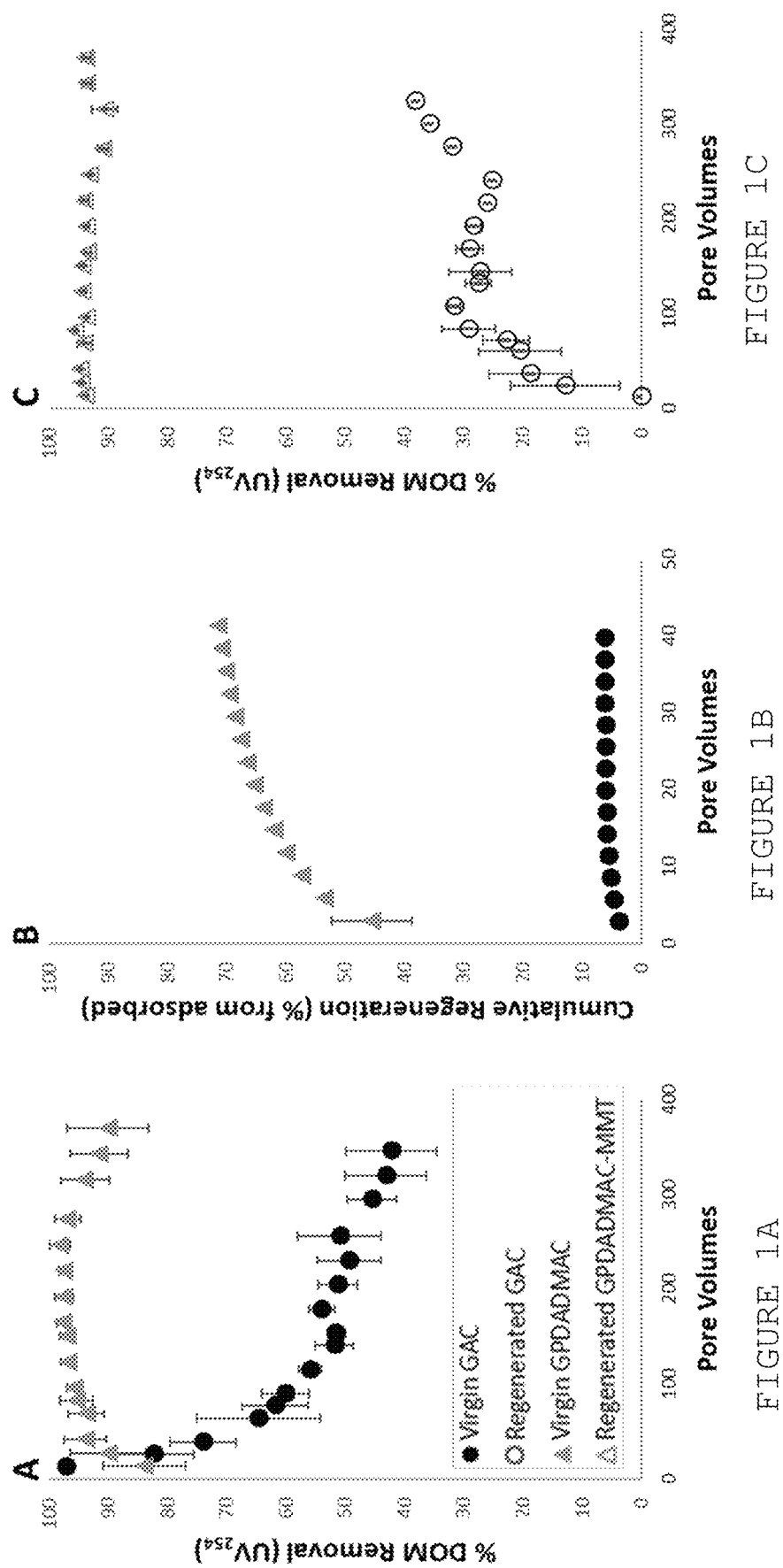
FIGS. 1a and 1c show DOM removal percentages plotted against bed volume, measured in filtration experiments of Suwannee River waters through columns packed with GAC or the GPDADMAC-clay of the invention, for virgin and regenerated particles.
FIG. 1b illustrates regeneration experiment.

Wyoming Na-montmorillonite SWy-3 (MMT) was obtained from the Source Clays Repository of the Clay Mineral Society (Columbia, MO). Poly(diallyl dimethyl ammonium chloride) (average $M_w$ 400,000-500,000), gallic acid, humic acid, tannic acid, and octanol were purchased from Sigma Aldrich. Toluene was purchased from Gadot-Group. Suwannee River NOM (2R101N) was obtained from the International Humic Substances Society (IHSS).

Lake Kinneret waters were obtained from Tiberius filtration plant after undergoing pH adjustment, flocculation with alum and sand filtration prior to filtration by GAC. The GAC used in this study was the virgin GAC (Hydraffin 30N, purchased from Benchmark Lt.) and the regenerated GAC employed in the plant.

The pH and the conductivity of the water are 7-8 and ~1300 µS/cm, respectively. Suwannee River water was prepared by adding the solid organic matter to distilled water with sodium chloride and sodium hydroxide to adjust the conductivity and pH to the values of Lake Kinneret.

Methods

The UV absorbance of the surface waters was measured at 200-300 nm by UV-Vis spectrophotometer (Thermo Scientific, Evolution 300, Waltham, MA). The UV absorption of Lake Kinneret was measured by a 10 cm quartz cuvette due to a very low absorption by a 1 cm cuvette.

DOC concentrations were determined by a total organic carbon analyzer (Shimadzu, Japan) and by laboratory total organic carbon analyzers (Sievers M5310 C, GE Analytical Instruments, USA).

Zeta potentials were measured with a Zetasizer Nano series (Malvern Instruments, UK).

The amount of PDADMAC adsorbed on the MMT was determined by an element analyzer calculated for carbon (FlashEA 1112, Thermo).

Preparing and Testing NMT-PDADMAC Granules

A series of experiments was conducted. The general procedure consists of combining NMT and PDADMAC in water under varying addition rates and mixing ratios, collecting the so-formed composites by filtration, drying in an oven to achieve masses with varying water content, forcing the wet masses through a screen, drying the granulate and sieving. The exact conditions are set out below and tabulated in Table 1.

PDADMAC was dissolved in distilled water to form 5 g/Liter solution. NMT was added to distilled water to form 5 g/Liter suspension. The PDADMAC solution and NMT suspension were separately stirred for 1-2 hours.

Next, a vessel equipped with a magnetic stirrer was charged with 10 liter of NMT suspension, followed by addition of the PDADMAC solution via peristaltic pump. The mixture was stirred for four hours, following which the solid was separated by filtration through 15 µm filter paper.

The wet cake was transferred to an oven (105° C.) and dried to the moisture content tabulated below. The mass was pressed through a mesh with 2.5 mm opening size. The granulate was then placed in an oven for 24 hours to achieve full dryness. The granules were sieved to collect the 0.3-2.5 mm fraction.

The granules were then tested to assess their 1) mechanical strength (by rubbing the granules between the thumb and finger), 2) stability against disintegration in water (by suspending the granules in tap water) and 3) electrostatic repulsion/attraction profile (by measuring the Zeta potential). The experimental conditions and results are tabulated below.

TABLE 1

| Ex. | clay:polymer weight ratio | Addition rate (ml/min) | Moisture (%) | Mechanical strength | Disintegration in water | ζ potential |
|---|---|---|---|---|---|---|
| 1 | 10:1 | 10 | 75 | strong | NO | negative |
| 2 | 8.3:1 | 9 | 55.3 | strong | NO | neutral |
| 3 | 6.25:1 | 10 | 56 | weak | YES | negative |
| 4 | 6.25:1 | 20 | 70 | strong | NO | positive |
| 5 | 0.83:1 | 10 | 60 | strong | NO | positive |
| 6 | 0.83:1 | 10 | 73.12 | strong | NO | positive |
| 7 | 0.83:1 | 12,000 | 70 | strong | NO | positive |

Next, granules were selected for DOM removal tests based on filtration of Lake Kinneret water through columns packed with the granular NMT-PDADMAC. The granules of Examples 1 and 3 were rejected and were not tested, due to their poor mechanical properties and negative surface charge (which is expected to cause electrostatic repulsion of the negatively charged DOM molecules).

The granules of Examples 2 and 4-7 were tested in column filtration experiments (see typical protocols in the next examples), from which the granules of Example 4 emerged superior, achieving 40-60% DOM removal rate, better than the other granules (DOM removal rates measured for the granules of Examples 2, 5, 6 and 7 were 15-30%, 20-40%, 15-40% and 10-30%, respectively).

Therefore, in the experimental work reported below, granules produced by the procedure of Example 4 were used (6.25:1 of NMT:PDADMAC mixing weight ratio; 20 ml/min addition rate of the polymer solution to the clay suspension, 70% moisture level of the mass prior to granulation, to produce mechanically strong granules with positive zeta potential around 30 mV).

Filtration of Surface Waters with High and Low SUVA Values Through GAC or GPDADMAC-MMT Packed Columns In this study, removal of DOM from Suwannee River and Lake Kinneret waters, with high (3.6-4.2) and low (~1) SUVA, respectively, by filtration with GAC and granular GPDADMAC-MMT columns, was investigated. Following the filtration, in-situ regeneration of the granular GPDADMAC-MMT, by passing a brine through the column, and ex-situ regeneration of GAC, by thermal reactivation, were carried out. Subsequently, the post-regeneration performance of the sorbents was demonstrated.

Experimental Protocol

DOM removal by filtration was performed at controlled room temperature 25° C. Glass columns (23 cm length, 1 cm diameter) were packed with 14 cm$^3$ sorbents. Lake Kinneret (3 mg/L DOC) or Suwannee River waters (1.8-6.7 DOC, varied for different experiments) were pumped through the columns with a flow rate of 1.7 ml/min, equal to a velocity of 1.3 m/h and an empty bed contact time of 8 min. Every few hours the effluent was collected, filtered with 0.45 μm PTFE syringe filters (simplepure) and DOM concentrations measured as described above. Lake Kinneret filtration experiments were performed also at controlled temperatures of 6° C. (in a walk-in refrigerator) and 40° C. (in a hothouse).

Column regeneration was obtained by pumping a brine solution (2M NaCl) through the columns (from the 25° C. experiments) with the same flow rate as the filtration experiments (1.7 ml/min). All of the volumes of the effluent were collected for mass balance and DOM discharged was measured by UV absorption.

Results

FIG. 1 presents the results of DOM removal from high SUVA value Suwannee River waters, adjusted to the DOC concentration of Lake Kinneret (Suwannee River DOM is commercially available in a powder form; it is added to water to form test solutions with desired DOM concentrations). In the graphs appended in FIGS. 1A and 1C, DOM removal rates measured in the filtration experiments are plotted against the pore volume.

The results in FIG. 1A indicate steadily high removal rates achieved by the granular GPDADMAC-MMT composite (marked by triangles), as opposed to sharp decrease in DOM removal percentages by the GAC column (marked by circles). The results suggest the presence of high percentage of macromolecules (mainly dissolved humic substances) among the $UV_{254}$-absorbing molecules in the bulk DOM. These macromolecules cause pore-clogging in GAC, leading to the sharp drop in its performance. The advantage demonstrated by the granular GPDADMAC-MMT composite is probably due to its ability to form strong electrostatic interactions with these humic substances and remove them from the water.

Turning now to FIG. 1B, the regeneration of the composite columns by rinsing with brine solution was nearly 70% (of the adsorbed material), whereas, GAC regeneration by the brine was extremely low, ~6% (FIG. 1B). The high desorption from the composite column, induced by an abrupt increase in the ionic stretch, supports the suggestion that the main adsorption mechanism is electrostatic, while GAC adsorbed DOM molecules thorough other chemical and physical interactions. An important result is that nearly two-thirds of the regeneration occurs within the third pore volume, which is only 0.75% of total pore volume initially passed through the column.

As shown in FIG. 1C, the performance of the GPDADMAC-MMT composite-packed column post-regeneration was very good, demonstrating high DOM removal rates, while the efficiency of thermally regenerated GAC was quite poor.

Figure 2C:
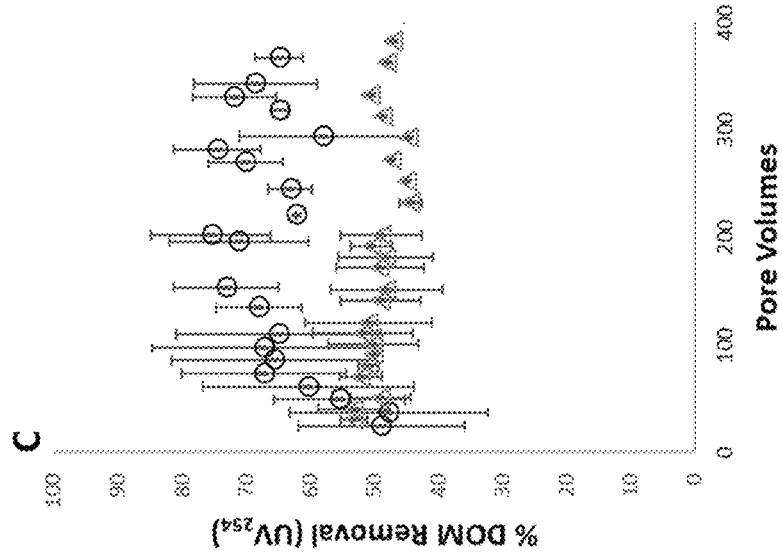
FIGS. 2a and 2c show DOM removal percentages plotted against bed volume, measured in filtration experiments of lake Kinneret waters through columns packed with GAC or the GPDADMAC-clay of the invention, for virgin and regenerated particles.

FIG. 2 presents the results of DOM removal from the low SUVA value Lake Kinneret waters.

The results are arranged in a similar manner to that discussed above: FIG. 2A (filtration through GAC and granular NMT-PDADMAC composite-packed columns), 2B (regeneration of the columns) and 2C (post-regeneration filtration).

The results shown in FIG. 2A indicate reversal of trend vis-à-vis FIG. 1A upon switching to low SUVA value waters, namely higher removal by GAC columns versus the granular GPDADMAC-MMT composite columns, suggesting that the granular composite of the invention is especially suitable for use in high SUVA waters (e.g., as for Suwannee River), rather than for low SUVA waters.

Figure 2B:
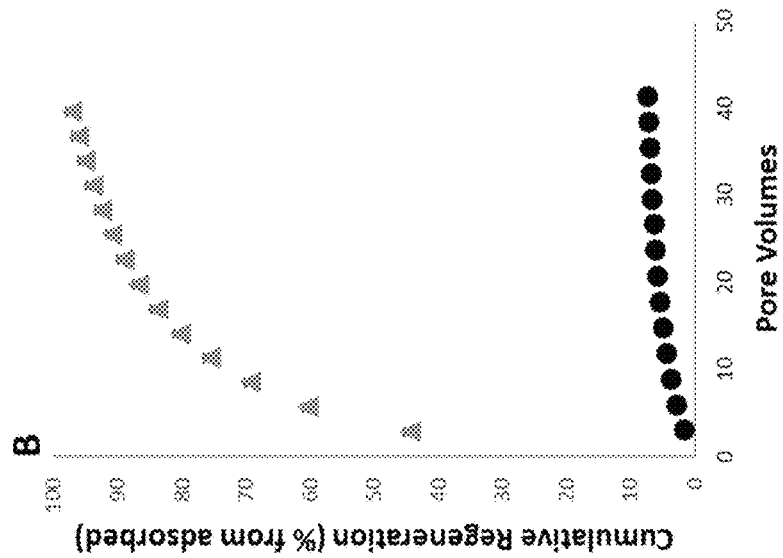
FIG. 2b illustrates regeneration experiment.
Figure 2A:
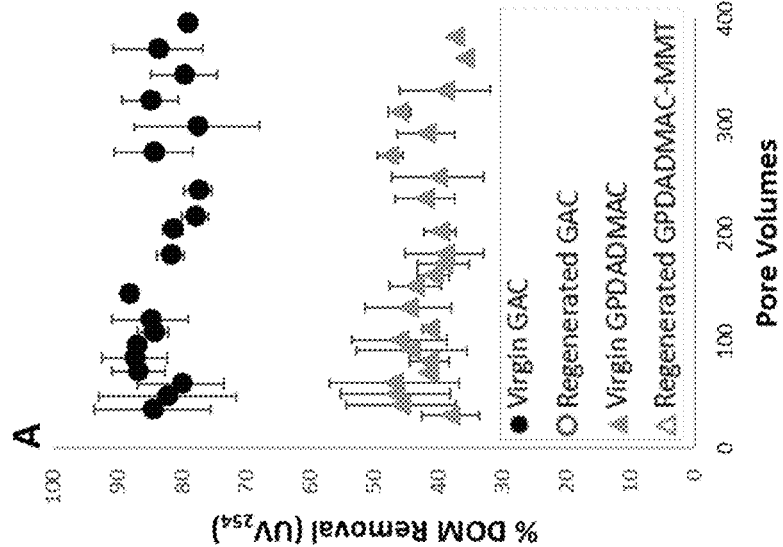

FIG. 2B shows that the despite the reversal of trend in the filtration experiments, the granular composite of the invention is of potential benefit owing to its excellent post-regeneration action. That is, efficient regeneration post-Lake Kinneret filtration with the aid of brine solution, reaching 97% discharge the regenerated composite, enables the regenerated composite of the invention to demonstrate DOM removal rates comparable to those obtained with the virgin composite (see FIGS. 2A and 2C, triangles). In contrast, thermally regenerated GAC demonstrates drop in performance (see FIGS. 2A and 2C, circles).

Affinity of GPDADMAC-MMT Granules Towards Various Organic Compounds

The adsorption of five different organic compounds (dissolved at concentration of 12.5 mg/L) by the granular GPDADMAC-MMT of the invention and GAC was tested at equilibrium (reached within 24 hours).

Experimental Protocol

The compounds selected for this study were toluene, octanol, gallic acid (GA), tannic acid (TA) and Aldrich humic acid (AHA) (pre-treated as described by Kam et al., 2001. Water Res. 35, 3557-3566)]. These compounds possess varied physicochemical properties such as size (molecular weight MW), charge (pKa), polarity (polar surface area), and aromaticity (number of rings).

The sorbents (90 mg) were added to solutions of the dissolved organic molecules (12.5 mg/l) and for GA also a sorbent concentration of 50 mg/L was measured. The samples were agitated overnight and the adsorption was calculated by measuring the concentrations in the supernatant. Gallic, tannic and humic acids were measured by UV absorption at 262, 276 and 254 nm, respectively. Toluene and octanol were measured by TOC.

Results

Figure 3:
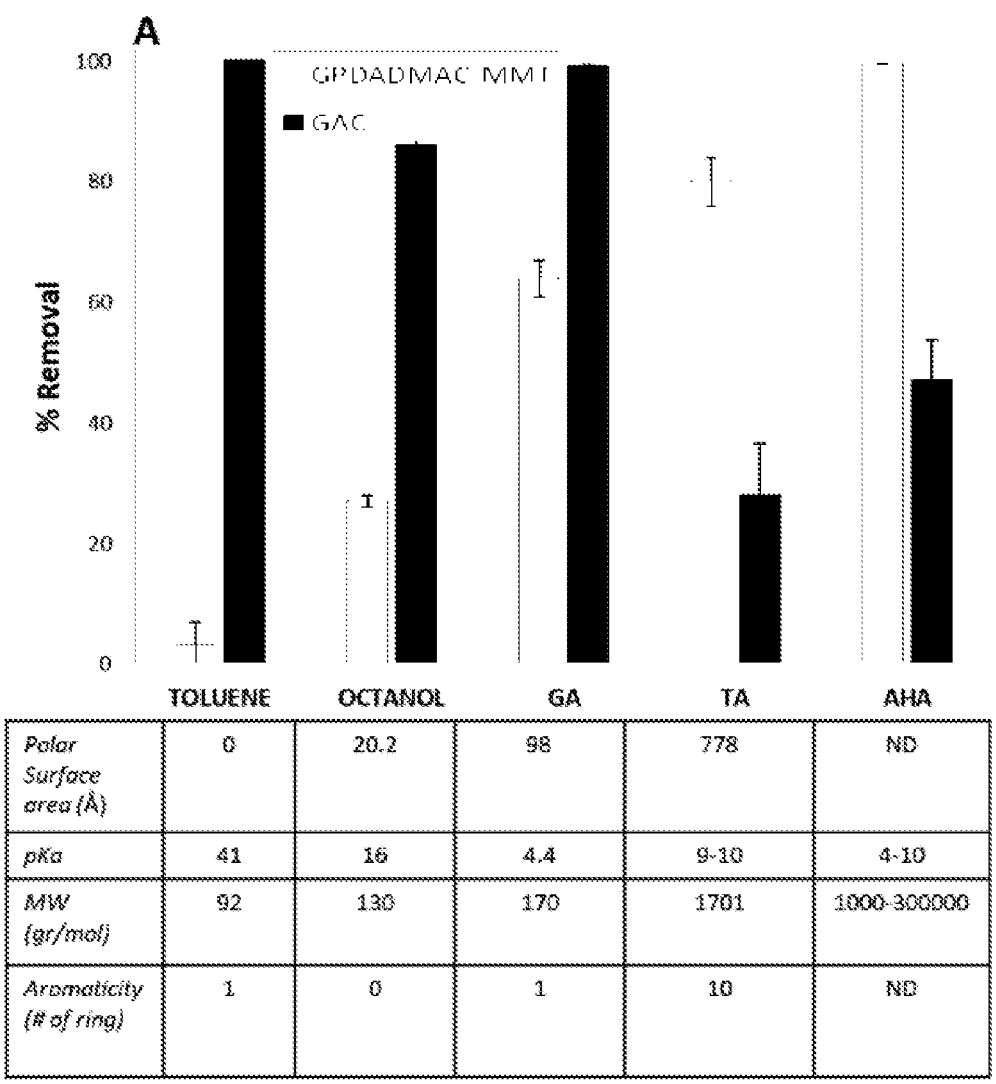
FIG. 3 is a bar diagram showing the adsorption of five different organic compounds by GAC and granular GPDADMAC-MMT of the invention.

The results (shown in FIG. 3 in the form of a bar diagram) indicate that very low affinity is demonstrated by the granular GPDADMAC-MMT towards toluene. The adsorption to the granular GPDADMAC-MMT increases with increasing charge, polarity and molecular weight of the compounds dissolved in the solution (due to electrostatic interactions and enthalpy gain, respectively). Owing to its positively charged surface, the granular GPDADMAC-MMT is especially useful in removing compounds which dissociate in water to form negatively charged species, e.g., organic acids. In contrast, GAC tends to adsorb small, aromatic and hydrophobic molecules. Toluene, which has all three features, is completely removed by GAC.

Filtration of Surface Waters with Low SUVA Values Through Columns Packed with a Combination of GAC and GPDADAMAC-MMT The goal of the study was to test the performance of a combination consisting of GAC and GPDADAMAC-MMT in a filtration column in terms of DOM removal from low SUVA waters. To this end, filtration columns were filled with both sorbents arranged in various configurations and Lake Kinneret water streams, with their characteristically low SUVA value, were passed through the columns.

Experimental Protocol

Glass columns (23 cm length, 1 cm diameter) were packed with a total volume 14 cm³ sorbents; bed height was 17.5 cm. Three downflow fixed bed filtration column designs were tested:
- the fixed bed is made up of equally proportioned homogeneous blend of GAC/GPDADAMAC-MMT;
- the fixed bed is made up of two layers of GAC and granular GPDADAMAC-MMT, the top layer consisting of GAC and each layer being 8.75 cm thick;
- the fixed bed is made up of two layers of GAC and granular GPDADAMAC-MMT, the top layer consisting of granular GPDADAMAC-MMT, and each layer being 8.75 cm thick;

Lake Kinneret (3 mg/L DOC) waters were pumped through the columns with a flow rate of 1.7 ml/min, equal to a velocity of 1.3 m/h and an empty bed contact time of 8 min. Every few hours the effluent was collected, filtered with 0.45 μm PTFE syringe filters (simplepure) and DOM concentrations measured as described above. Lake Kinneret filtration experiments were performed at controlled temperatures of 6° C. (in a walk-in refrigerator), at 27° C. and 40° C. (in a hothouse).

Results

Figure 4:
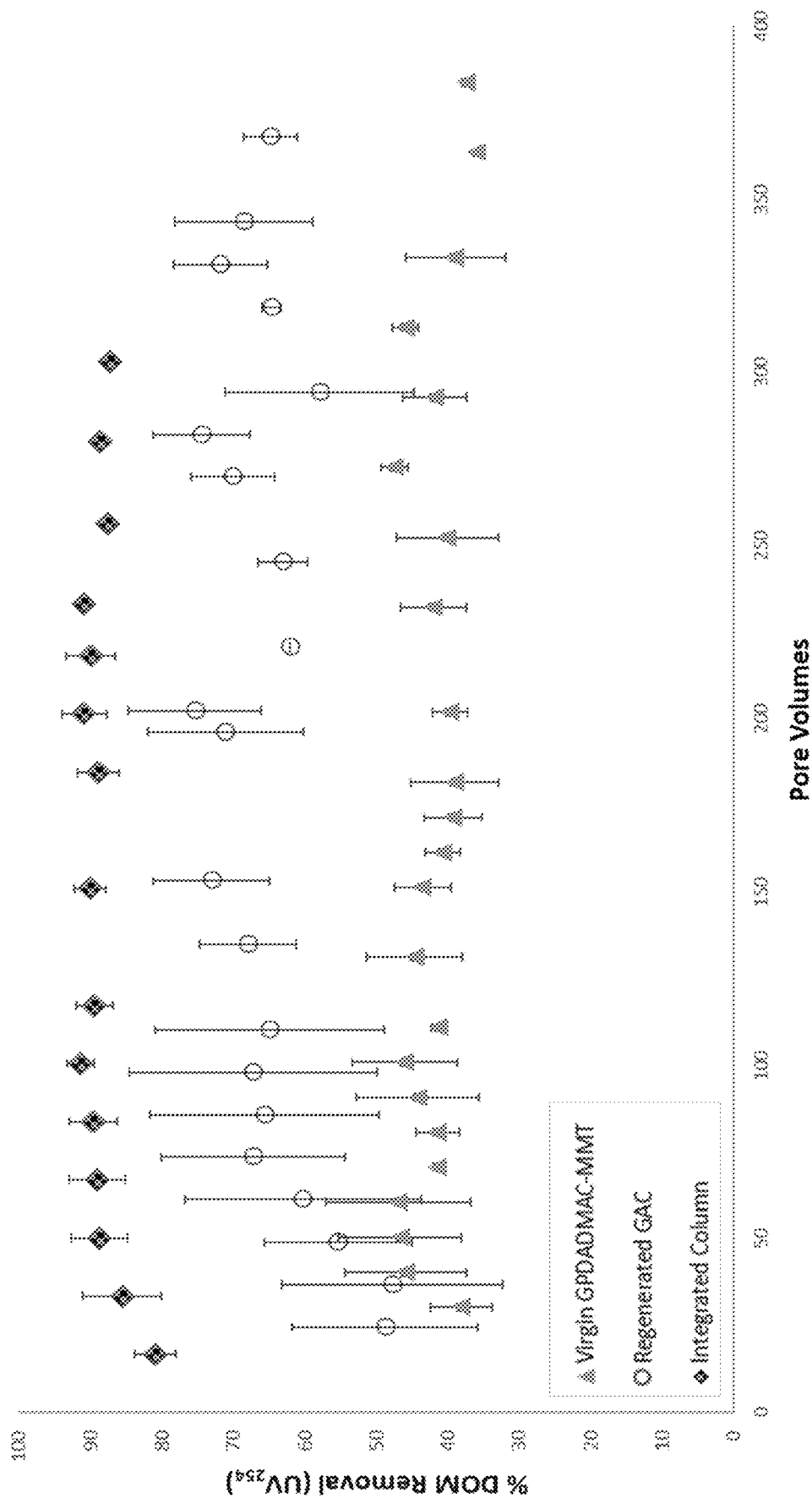
FIG. 4 shows DOM removal percentages plotted against bed volume, measured in filtration experiments of lake Kinneret waters through columns packed with GPDADMAC-clay, GAC and their blend.

As shown in FIG. 4, the integrated columns demonstrated superior performance with 90% DOM removal (all three designs were equally good and results shown in FIG. 4 represent their average), better than removal rates measured for regenerated GAC or virgin GPDADMAC-MMT (about 75 and 40%, respectively—see also FIG. 1). The data shown in FIG. 4 is based on filtration experiments carried out at 27° C.

The effect of temperature change (6° C.→27° C.→40° C., simulating temperature variation throughout the year) was also investigated in this study and the results are tabulated below. It is seen that removal of Lake Kinneret DOM by the GAC column increases moderately with increasing temperature, such that the difference (Δ) between removal rates measured at 40° C. and 6° C. is less than 10% (e.g., Δ=+5-8%). In contrast, DOM filtration by the GPDADMAC-MMT column decreases with increasing temperature, such that removal rates measured at 40° C. can be significantly lower than removal rates measured at 6° C. DOM filtration by the integrated column, averaged out the changes in removal, stabilizing the filtration performance.

TABLE 2

| DOM removal (%) by | volume passed (ml) | 6° C. | 27° C. | 40° C. | Δ Removal |
|---|---|---|---|---|---|
| GAC | 202 | 88 | 90 | 96 | 8 |
|  | 2218 | 86 | 88 | 92 | 6 |
|  | 2923 | 86 | 89 | 91 | 5 |
|  | 4637 | 83 | 83 | 89 | 6 |
| GPDADMAC-MMT | 202 | 54 | 34 | 13 | −41 |
|  | 2218 | 51 | 46 | 37 | −14 |
|  | 2923 | 54 | 47 | 38 | −16 |
|  | 4637 | 52 | 46 | 39 | −13 |
| Integrated column | 202 | 92 | 89 | 92 | 0 |
|  | 2218 | 85 | 90 | 88 | 3 |
|  | 2923 | 87 | 90 | 85 | −2 |
|  | 4637 | 82 | 87 | 83 | 1 |

Removal of Pharmaceutical Micropollutants from Secondary Wastewater Flowing Through Columns Packed with GPDADAMAC-MMT The purpose of the study was to investigate the removal of pharmaceutically active compounds from secondary effluent generated in a municipal wastewater treatment plant, by fixed-bed adsorption to the granular composite of the invention, GPDADMAC-MMT and comparative sorbents. The pH of the secondary effluent was ~7.5 and its COD level was ~31 mg/liter.

Experimental Protocol

The as-received secondary effluent was filtrated using a vacuum pump through 0.45 μm filtering papers,to remove undissolved matter. The filtered secondary effluent (FSE) served as the feed solution for the micropollutant removal filtration experiments.

The FSE was charged to a glass tank and maintained under constant stirring throughout the filtration experiment, which was performed at room temperature over forty-eight hours. The experimental set-up consists of four 1.6 cm diameter glass columns, each packed with 15 cm³ of the following sorbents:
- GAC;
- regenerated GAC;
- GPDADMAC-MMT; and
- GAC/GPDADMAC-MMT blend (arranged in two layers, bottom layer: GAC top layer: GPDADMAC-MMT)

The (FSE) was simultaneously caused to flow through the four columns using four peristaltic pumps (Watson Marlow 520U) operating at a flow rate of 0.75 ml/min. Each of the columns discharged to its respective recipient. The treated effluents were sampled 6 hours and 18 hours from the beginning of the experiment, and finally, at the end of the 48 hours test period. The concentrations of the pharmaceutical compounds were measured by Liquid chromatography-mass spectrometry (LC-MS).

Results

The pharmaceutically active compounds, the removal of which was investigated, are carbamazepine (non-ionic), diclofenac (anionic; used commercially as in a salt form with sodium or potassium) and metoprolol (cationic; used commercially in a salt form with tartaric acid). The initial concentrations of the micropollutants were 0.729 ng/mL for carbamazepine, 1.231 ng/mL for diclofenac and 0.061 ng/mL for metoprolol.

The results are shown in the form of bar diagrams. The left (black) and right (green) bars correspond to the removal rate achieved with GAC-packed and GPDADMAC-MMT-packed columns, respectively.

Figure 5A:
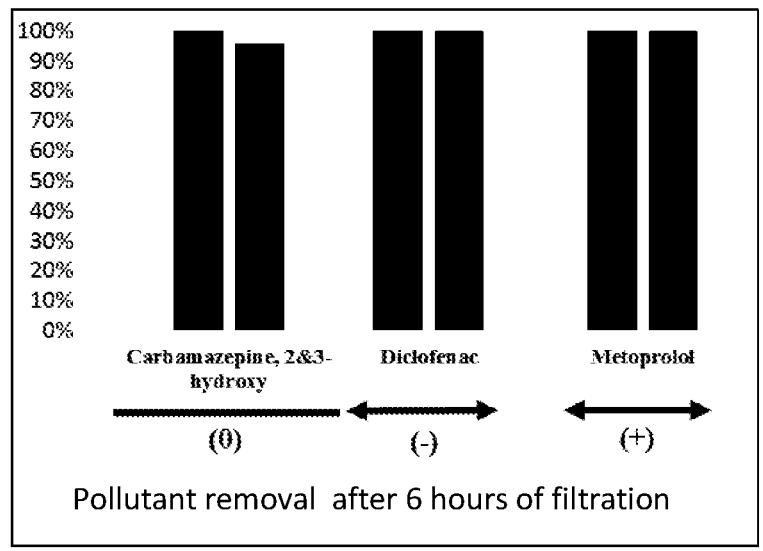
FIGS. 5a and 5b are bar diagram showing removal percentage of micropollutants (pharmaceutical compounds) from secondary effluent, measured in filtration experiments through columns packed with GAC or GPDADMAC-clay, after six hours (5a) and eighteen hours (5b).

The results shown in FIG. 5A (which pertain to removal of the pharmaceuticals compounds after six hours) indicate that the granular sorbent of the invention is equally effective to GAC in removal of adsorbates consisting of small compounds (200-500 g/mol) with varying properties, i.e., which exist in solution as neutral, negatively and positively charged species. The ability of GPDADMAC-MMT to remove metoprolol (cationic) and carbamazepine (non-ionic) is surprising, bearing in mind the fact that its outer layer is positively charged. This may be explained by sites at the clay which are not occupied by the polymer and remain available for cation exchange with the positively charged metoprolol.

Figure 5B:
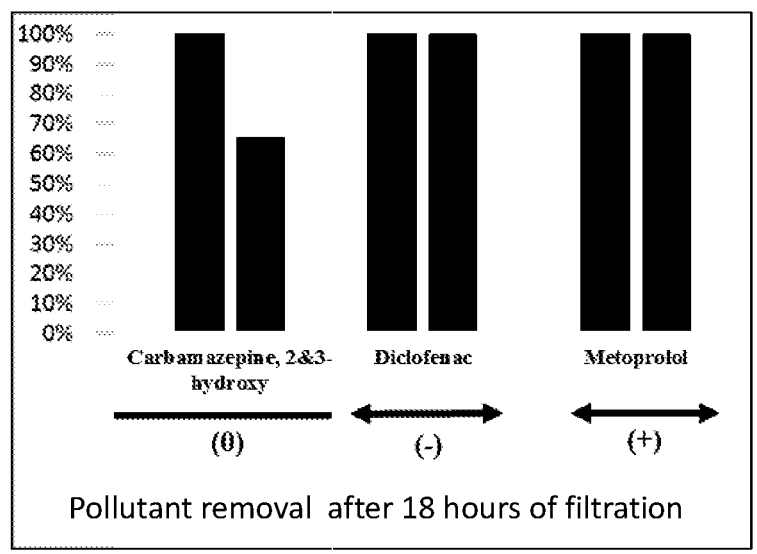

Turning now to FIG. 5B, it is of note that after 18 h of filtration, removal of anionic and cationic pharmaceutical compounds by GPDADMAC-MMT is still very efficient. On the other hand, a lower removal of the non-ionic compound is noted, owing to the clay adsorption sites getting progressively saturated. Similar trends were observed at the end of the 48 hours test period (not shown).

Figure 6:
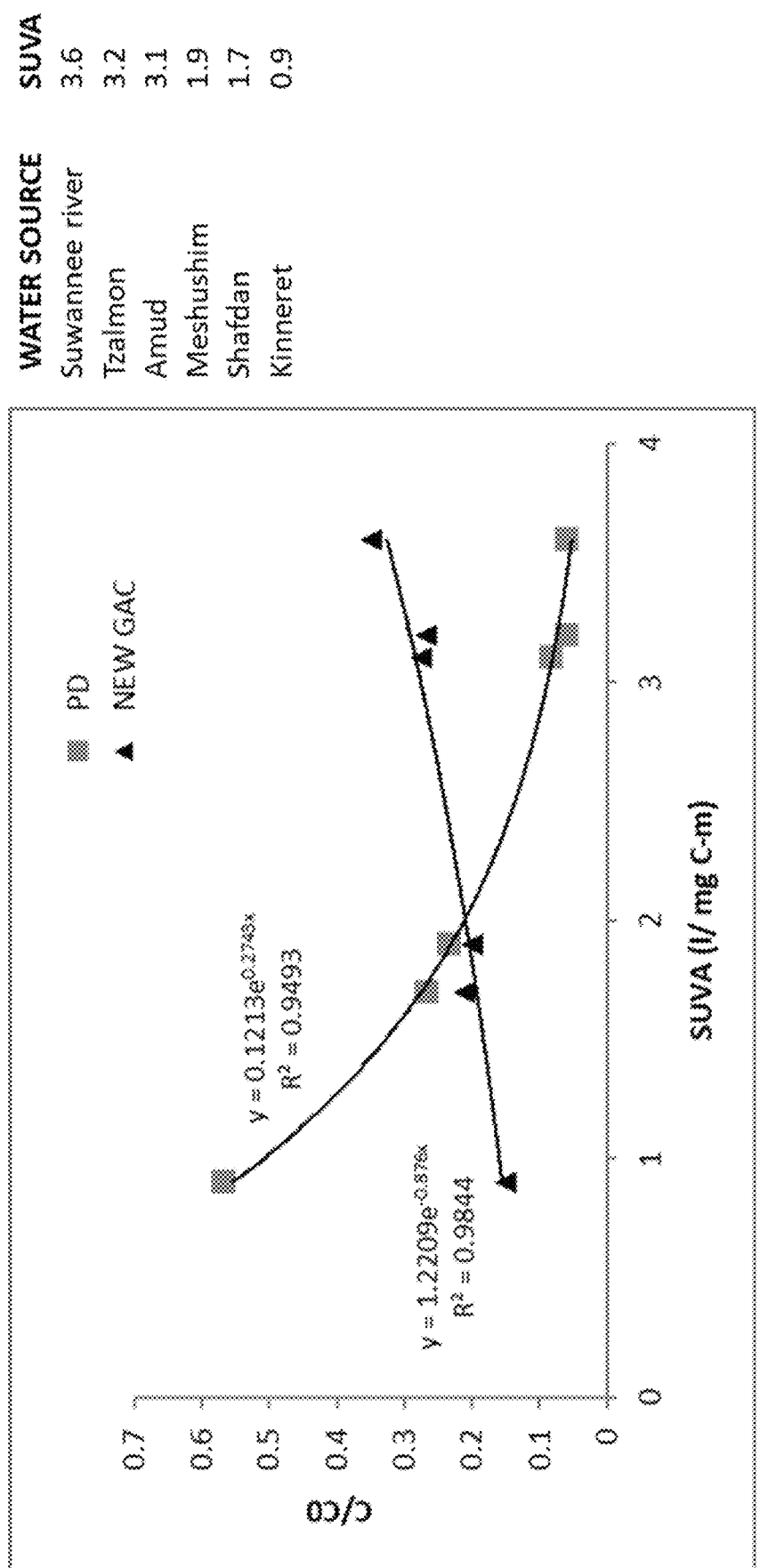
FIG. 6 shows plots of removal rates versus SUVA, measured for GPDADMAC and GAC.

Filtration of Surface and Treated Waste Waters with Varying SUVA Values Through GAC or GPDADMAC-MMT Packed Columns FIG. 6 shows removal rates of DOM (C/Co initial concentration/eluting concentration (measured by UV 254 nm) at ~70 pore volumes), achieved by GAC (marked by squares) and GPDADMAC-MMT (marked by triangles), versus SUVA values (water was collected from six locations, SUVA varying in the range from 0.9 to 3.6)

As the SUVA of source water increases, removal rate achieved by the GPDADMAC-MMT columns increases. An opposite trend is observed for GAC. These results suggest that optimal sorbent mixtures could be designed, combining GAC and GPDADMAC-MMT, to maximize DOM removal based on the water's SUVA. For example, by passing the stream through a fixed-bed consisting of a mixed granular material in the form of homogeneous blend of GAC and GPDADAMAC-MMT, or with the fixed-bed consisting of a mixed granular material in the form of alternate layers of GAC and GPDADAMAC-MMT.

While the present disclosure has been illustrated and described with respect to a particular embodiment thereof, it should be appreciated by those of ordinary skill in the art that various modifications to this may be made without departing from the spirit and scope of the present disclosure.

The invention claimed is:

1. A process for preparing a granular composite adsorbent, comprising combining poly(diallyl dimethyl ammonium halide) and a clay mineral in water at 5:1 to 7:1 clay/polymer weight mixing ratio, maintaining the mixture under stirring, recovering a wet mass, wherein the wet mass is recovered by separating a wet solid from the water and adjusting its moisture content in the range from 65 to 75 wt. %, forming the wet mass into granules and freeze-drying the granules to obtain the granular adsorbent having a surface layer with positive zeta potential, wherein the granular composite is binder-free and is stable against disintegration in water.

2. A process according to claim 1, wherein the polymer and the clay mineral are combined in a controlled manner by slowly adding an aqueous polymer solution to a suspension of the clay mineral in water.

3. A process according to claim 1, wherein the clay mineral has cation exchange capacity of not less than 30 milliequivalents/100 g.

4. A process according to claim 3, wherein the clay mineral comprises montmorillonite.

5. A process according to claim 1, comprising pressing the wet mass through a screen to form granules.

6. A process according to claim 1, wherein the adsorbent consists of granules with an average particle size within the range from 0.3 mm to 2.5 mm.

7. Granular sorbent comprising poly(diallyl dimethyl ammonium halide) and a clay mineral, said granular sorbent having a surface layer with positive zeta potential, wherein the granular sorbent is freeze-dried, binder-free, and stable against disintegration in water.

8. Granular sorbent according to claim 7, comprising: from 85 to 93 wt. % of a clay mineral having cation exchange capacity of not less than 30 milliequivalents/100 g; and from 7 to 15 wt. % of poly(diallyl dimethyl ammonium halide).

9. Granular sorbent according to claim 8, comprising: from 88 to 90 wt. % of a clay mineral having cation exchange capacity of not less than 30 milliequivalents/100 g; and from 10 to 12 wt. % of poly(diallyl dimethyl ammonium halide).

10. A method of water treatment, comprising removing dissolved organic material from water by adsorption onto the granular sorbent defined in claim 7.

11. A method according to claim 10, wherein the adsorption is a fixed-bed adsorption.

12. A method according to claim 10, wherein the dissolved organic material possesses high aromatic content, indicated by the water having $SUVA_{254}$ value above 2.

13. A method according to claim 10, further comprising regenerating the granular sorbent by rinsing with a salt solution.

14. A method of water treatment, comprising removing dissolved organic material from water by adsorption onto: granular activated carbon; and granular adsorbent comprising poly(diallyl dimethyl ammonium halide) and a clay mineral as defined in claim 7.

15. A method according to claim 14, wherein the adsorption is a fixed-bed adsorption, with the fixed-bed consisting of a mixed granular material in the form of homogeneous blend of GAC and GPDADAMAC-MMT, or with the fixed-bed consisting of a mixed granular material in the form of alternate layers of GAC and GPDADAMAC-MMT.

16. A method according to claim 14, comprising passing the water through an array of fixed-bed adsorption columns connected to operate in series, wherein one or more of said columns is(are) packed with granular activated carbon and one or more of the remaining columns is(are) packed with the granular adsorbent comprising poly(diallyl dimethyl ammonium halide) and a clay mineral, said granular adsorbent having a surface positive zeta potential.

17. A method according to claim 10, wherein the dissolved organic material to be removed from the water comprises anionic and/or cationic pharmaceutical compounds.

* * * * *